(12) United States Patent
Adebimpe

(10) Patent No.: US 8,444,881 B2
(45) Date of Patent: May 21, 2013

(54) METHODS FOR MAKING SCENT SIMULANTS OF CHEMICAL EXPLOSIVES, AND COMPOSITIONS THEREOF

(75) Inventor: David O. B. A. Adebimpe, Annapolis, MD (US)

(73) Assignee: David O.B.A. Adebimpe, Annapolis, MD (US)

( * ) Notice: Subject to any disclaimer, the term of this patent is extended or adjusted under 35 U.S.C. 154(b) by 949 days.

(21) Appl. No.: 12/222,738

(22) Filed: Aug. 14, 2008

(65) Prior Publication Data

US 2009/0194744 A1    Aug. 6, 2009

Related U.S. Application Data

(60) Provisional application No. 60/935,515, filed on Aug. 14, 2007.

(51) Int. Cl.
     *G01N 31/00*      (2006.01)
     *C06B 21/00*      (2006.01)

(52) U.S. Cl.
     USPC ........................................ 252/408.1; 422/163

(58) Field of Classification Search
     USPC ........................................ 252/408.1; 422/163
     See application file for complete search history.

(56) References Cited

U.S. PATENT DOCUMENTS

| | | | |
|---|---|---|---|
| 4,222,955 A * | 9/1980 | Chung et al. | ................... 558/418 |
| 4,987,767 A | 1/1991 | Corrigan et al. | |
| 5,359,936 A | 11/1994 | Simpson et al. | |
| 5,413,812 A | 5/1995 | Simpson et al. | |
| 5,585,575 A | 12/1996 | Corrigan et al. | |
| 5,648,636 A | 7/1997 | Simpson et al. | |
| 5,958,299 A | 9/1999 | Kury et al. | |
| 7,694,628 B2 | 4/2010 | Adebimpe et al. | |
| 7,932,089 B2 | 4/2011 | Cohen-Arazi et al. | |
| 2006/0037509 A1 | 2/2006 | Kneisi | |
| 2007/0255057 A1* | 11/2007 | Cedilote et al. | ................ 544/107 |
| 2009/0199936 A1 | 8/2009 | Hagit et al. | |
| 2011/0168950 A1 | 7/2011 | Cohen-Arazi et al. | |

* cited by examiner

*Primary Examiner* — Lore Jarrett

(57) ABSTRACT

The present invention relates to methods for producing non-detonable and non-explosive parent-odor scent simulants of both detonable and entropy-burst chemical explosive materials. A detonable explosive material is a material that explosives with the aid of detonation while an entropy burst explosive material is a very sensitive energetic material that does not require detonation, but explodes through a spontaneous decomposition of its molecules into gaseous products. The invention also presents representative non-detonable, non-hazardous compositions of such simulants that can be safely and effectively utilized within a broad spectrum of biological and non-biological explosives detection programs, non-limiting examples being the training of biological search-and-detect creatures such as explosive detecting dogs and the calibration of electronic explosive detecting instruments that rely on the principles of vapor sampling for their operations.

58 Claims, 1 Drawing Sheet

A schematic for the method for making a scent simulant that mimics the odors of live chemical explosives.

A schematic for the method for making a scent simulant that mimics the odors of live chemical explosives.
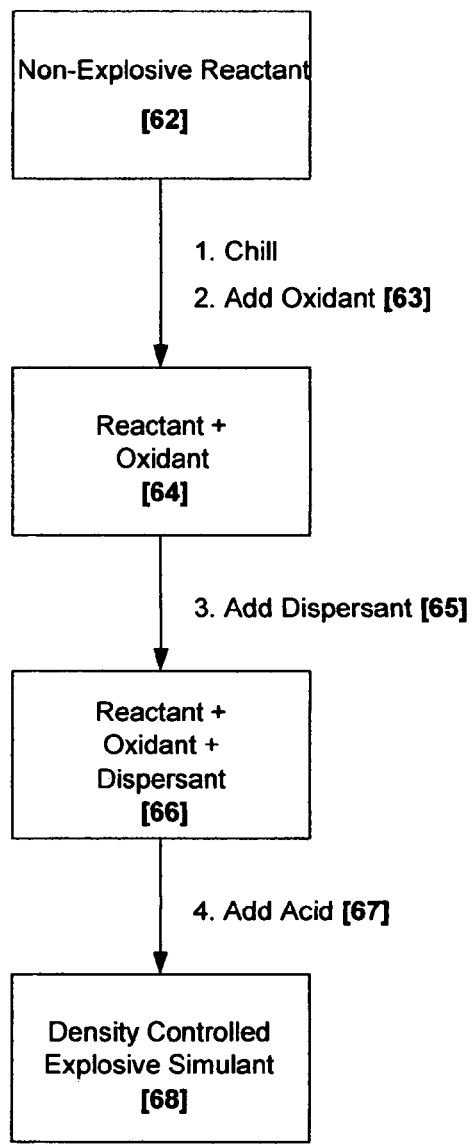

METHODS FOR MAKING SCENT SIMULANTS OF CHEMICAL EXPLOSIVES, AND COMPOSITIONS THEREOF

CROSS REFERENCE TO RELATED APPLICATIONS

This application claims the priority benefit to U.S. Provisional Patent Application No. 60/935,515, titled Methods for Making Scent Simulants of Chemical Explosives and Compositions Thereof, to David O. B. A. Adebimpe, filed Aug. 14, 2007, and which is incorporated by reference herein in its entirety.

STATEMENT REGARDING FEDERALLY SPONSORED RESEARCH

Not Applicable

FIELD OF INVENTION

The present invention generally pertains to non-explosive scent simulants of detonable and entropy burst explosive materials. Entropy burst explosive materials, in particular, are especially sensitive to handling and confinement in their native state and, as such, are currently unavailable for research and development efforts pertaining to its detection. It relates to experimental methods for producing non-explosive scent simulants of such materials and compositions that can be used within both biological detection programs such as canine explosives detection and in non-biological detection programs such as the calibration of explosives detecting instrumentation.

BACKGROUND OF THE INVENTION

As the worldwide proliferation of the use of explosives within terrorist activities intensifies, governments from all over the world have hurried to establish security programs that can detect the presence of explosive materials, in an effort to protect their national security, citizenry and infrastructure. Such initiatives typically involve the use of search-and-detect explosives detecting canines (K9's), point-detection analytical instruments, or a combination of both, in the detection of explosives materials. To optimize these initiatives, there is need for the production of improved scent simulants to use as training aids within canine evaluation and training programs, and for the calibration of explosives detection instruments that detects through vapor sampling techniques.

Several scent simulants of explosive materials that can serve as training aids within canine detection programs have been developed. For example, U.S. Pat. Nos. 5,648,636, 5,413,812 and 5,359,936, granted to Simpson et al., relate to explosive scent simulants of detonable materials made through a combination of an already-fabricated explosive material with an inert material, either in a matrix or as a coating, where the explosive has a high surface ratio but small volume ratio.

In these embodiments, the explosive simulants may be fabricated by using either of two techniques. A first method involves the use of the standard slurry coatings to produce a material with a very high binder to explosive ratio without masking the explosive vapor, and a second method involves coating inert substrates with thin layers of the explosive. In both methods, actual explosives are used in the fabrication of the simulators—these explosives are diluted into slurries which are thereafter used to coat the surfaces of inert substrates.

Explosive simulants have also been fabricated for detection methods based on analytical principles other than that pertaining to vapor sampling. For example, U.S. Pat. No. 5,958,299 issued to Kury et al. relates to methods for fabricating non-energetic explosive simulants. The simulants imitate real explosives in terms of mass density, effective atomic number, x-ray transmission properties, and physical form. Since they are fabricated for a detection method based on analytical principles different from those pertaining to scent detection, they are not scent simulants and therefore not suitable for biological detection or for the calibration of instruments that rely on the principles of headspace vapor sampling to detect detonable materials.

US Patent 20060037509, issued to Phillip Kneisi, describes a scent training aid container for use in canine scent detection training. The container is made of a non-volatile material such as metals and ceramics and is of different dimensions. These training aids containers are designed to accommodate undiluted explosives in dimensions less than the explosive's critical thickness and serve as a scent source for scent training. The patent pertains only to the container and is required to be filled with actual explosives and explosive materials.

With all the advances made in the production of explosive scent simulants, there are still limitations that currently available and traditional slurry methods lend to the formation of optimized scent simulants for search-and-detect creature training and instrument calibration.

One limitation pertains to the loss of the more volatile components within the explosive material used in the production of the simulant, during the mechanical mixing processes employed in the formation of the simulant. During mechanical mixing, the heat of the mixing process results in a drastic reduction in, and, in some cases, the complete loss of, the more volatile components of the explosive material being used in the production of the simulant and the production of a scent simulant with an incomplete scent signature.

Another limitation occurs during attempts to evaporate the solvent used in a slurry making process, whereby all components within the explosive material being used in the production of the simulant, and that has a boiling point that is lower than that of the solvent used in the slurry making process, also evaporates from the slurry. The low boiling-point solvent might also lead to the low temperature evaporation of some components which, although having a higher boiling point, are miscible with the solvent.

Another limiting factor is the introduction of new odors. Since, in most cases, the solvent used in making the slurry coatings is different from any of the solvents used typically used during the manufacture of these explosives, drying of the slurry results in the entrapment of these solvents within the simulants formed, through inclusion within the structure of the simulant during crystallization, which concomitantly leads into the introduction of new odors within the headspace scent signature of the simulant which is not present within the explosive material being slurried or simulated.

Yet another limitation on presently available methods of making scent simulants is the sensitivity of certain explosives. There exist classes of explosives that need detection but for which scent simulants and training aids for search-and-detect creatures or instrument detection are unavailable simply because such explosives are so sensitive to storage, shock friction, static and temperature that they cannot be transported, handled, or stored in the bulk quantities needed for a commercialized production of scent simulants using prior art methods, nor can they be used within a formulation process that requires a direct handling and mixing of actual explosives into a slurry.

Particular amongst such explosives are detonable explosives such as nitroglycerin, and the group of explosives known as entropy-burst explosives, which, unlike typical detonable explosives, are extremely sensitive to shock, friction, and long term storage.

In view of the difficulties associated with the forming scent simulants and K9 detection training aids of very sensitive explosives using traditional slurry methods, there is a continuing need for new preparative methods for these simulants that is easy, convenient, safe, inexpensive, covers the whole spectrum of explosives needing detection, and still leads to the production of superior explosives detecting canine training aids and explosives detection analytical-instrument calibration aids.

SUMMARY OF THE INVENTION

The present invention generally relates to methods for producing inert scent simulants of sensitive chemical explosive materials such as "detonable" and "entropy burst" chemical explosive materials, and some compositions thereof.

These compositions can be used as safe training aids to expand the training regime of explosives-detecting canines and of other explosive search-and-detect creatures such as dolphins.

Furthermore, they can be used in the routineous calibration of explosives detecting instrumentation such as those present within land/sea/air terminals and ports-of entry, and within research programs geared towards olfaction and explosives detection.

Since these compositions are non-explosive, they can be stored and transported using methods and forms, which, as pure explosives, would be hazardous or impossible.

According to one aspect of the present invention, it is possible to render an explosive material non-explosive through the in-situ syntheses and intercalation of such a material within the interstices of a non-reacting, non-odoriferous, porous density-controlling material.

The porous density controlling matrix serves to change the solid-state mechanochemical properties of the product formed to that of a non-explosive material by increasing the degree of heterogeneosity of explosive, reducing the critical mass and crystal continuity, forming a barrier against detonation transfer, attenuating shock through the bulk, and at the same time acting as a non-odoriferous diluent The present invention also relates to a method for making a scent simulant that mimics the odors of an explosive material comprising the steps of a.) cooling a solution of non-explosive reactants from about 15° C. to about −10° C.; b.) optionally adding an oxidant; c.) adding a density controlling material to the solution of step a.) and/or b.), thereby forming a slurry; d.) adding an acid to the slurry of step c.), thereby forming a scent simulant comprising an in situ explosive material formed within the interstices of a density controlling material; and e.) filtering the slurry of step d.), thereby collecting the scent simulant formed in step d.).

It is an embodiment of the present invention, wherein the non-explosive reactants of step a.) are precursors of explosive materials.

It is an embodiment of the present invention, wherein the explosive material engendered within the density controlling material is at a concentration that is non-detonable.

It is an embodiment of the present invention, wherein the precursors of explosive materials are selected from the group consisting of hydrocarbons, ketones, and amines.

It is an embodiment of the present invention, wherein the precursors of explosive materials are selected from the group consisting of triazol-3-one, benzene, naphthalene, stilbene, toluene, mononitrotoluene, phenol, triamino benzene, nitrobenzene, dinitrobenzene, dinitrotoluene, 2,6-bis-picrylamino pyridine, glycerine, ethylene glycol, diethylene glycol, pentaeritol, cellulose, mannitol, ethyl trimethylol, hexahydro-1,3,5-triazine, methylamine, octahydro-1,3,5,7-tetrazocine, diazophenol, phenylmethylnitramine, methylene diamine, hexamine, cellulose, acetone, triethylamine, butanone, potassium chloride, ammonium hydroxide, acceptable salts thereof, or combinations thereof.

Another embodiment of the present invention includes optionally adding an oxidant selected from the group consisting of peroxide, hydrogen peroxide, or acceptable salts thereof, to the solution in step a).

It is an embodiment of the present invention, wherein the optionally added oxidant is selected from the group consisting of calcium peroxide, strontium peroxide, or barium peroxide.

It is an embodiment of the present invention, wherein the scent simulant of step d.) is optionally neutralized.

It is an embodiment of the present invention, wherein the scent simulant of step e.) is capable of mimicking the odors of explosive materials.

Yet another embodiment of the present invention includes the scent simulant of step d.) being vacuum filtered.

Still another embodiment of the present invention includes the scent simulant of step e.) being optionally rinsed with distilled water, alcohol, or alkaline solutions ranging from about 1% alkalinity to about 25% alkalinity, or any combinations thereof.

It is an embodiment of the present invention, wherein the explosive materials simulated in step d.) are selected from the group consisting of 5-nitro triazol-3-one (NTO), trinitrotoluene (TNT), trinitrotriamino benzene (TATB), 3,5-dinitro-2,6-bis-picrylamino pyridine (PYX), nitroglycerine (NG), ethylene glycol dinitrate (EGDN), diethylene glycol dinitrate (DEGDN), 2,2-bis[(nitroxy)methyl]-1,3-propanediol dinitrate (or pentaeritol tetranitrate) (PETN), trimethylol ethyl trinitrate (TMETN), tetryl, hexahydro-1,3,5-trinitro-1,3,5-triazine (RDX), methylamine nitrate, octahydro-1,3,5,7-tetranitro-1,3,5,7-tetrazocine (HMX), nitroguanidine, potassium nitrate, ammonium nitrate, urea nitrate, ammonium picrate, nitrocellulose, triacetone triperoxide (TATP), diacetone peroxide, tributanone triperoxide (TBTP), hexamethylene triperoxide (HMTD), mannitol hexanitrate, cyclohexanone peroxide, the diacetone alcohol peroxide, methylcyclohexanoneperoxide, or any combinations thereof.

It is an embodiment of the present invention, wherein the acid of step d.) is an organic acid.

It is an embodiment of the present invention, wherein the organic acid is selected from the group consisting of acetic acid, peracetic acid, citric acid, phosphoric acid, phosphorous acid, adipic acid, malic acid, phthalic acid, oxalic acid, cinnamic acid, benzoic acid, hydroxybenzoic acid, glycolic acid, formic acid, glycolic acid, lactic acid, propionic acid, butyric acid, acrylic acid, muriatic acid, sulfamic acid, tartaric acid, glucuronic acid, or any combinations thereof.

It is an embodiment of the present invention, wherein the acid of step d.) is an inorganic acid.

It is an embodiment of the present invention, wherein the inorganic acid is selected from the group consisting of hydrochloric acid, sulfuric acid, nitric acid or any combinations thereof.

Still another embodiment of the present invention includes having the slurry of step d.) being diluted with distilled water, deionized water or an aqueous alkaline solution ranging from about 1% alkalinity to about 25% alkalinity.

It is an embodiment of the present invention, wherein the density controlling material of step c.) is an organic material.

It is an embodiment of the present invention, wherein the organic material is selected from the group consisting of natural polymer gums, synthetic polymers gums, wood flour and flours, fibers of other natural products, synthetic fibers, grain husks, odor free cellulose, saw-dust, nut shells, starches, starch derivatives, or any combinations thereof.

It is an embodiment of the present invention, wherein the density controlling material of step c.) is an inorganic material.

It is an embodiment of the present invention, wherein the inorganic material is selected from the group consisting of clay, zeolites, silica, porous glass beads, glass fibers, calcium carbonate, talc, kaolin, mica, barium sulfate, metal oxides and hydroxides, carbon black, graphite, or any combinations thereof.

It is an embodiment of the present invention, wherein the density controlling material of step c.) is chemically inert to the precursors of explosive materials of step a.)

It is an embodiment of the present invention, wherein the density controlling material of step c.) is chemically inert to the optional oxidant of step b.)

It is an embodiment of the present invention, wherein the density controlling material of step c.) added to the slurry is from about 2 to 100 times by weight of the expected scent simulants of step e.).

It is an embodiment of the present invention, wherein the density controlling material of step c.) has a pore size of about 100 mico-meters to about 0.10 nano-meters.

Yet another embodiment of the present invention includes having the density controlling material of step c.) with a porosity of about 2% to about 98%.

Still another embodiment of the present invention includes having the explosive materials being formed within the interstices of the density controlling material of step c.).

Further still, another embodiment of the present invention includes having steps a.) through e.) being carried out in a shear mixer.

It is an embodiment of the present invention, wherein steps a.) through e.) may optionally occur at temperatures ranging from about 70° C. to about −10° C.

It is an embodiment of the present invention, wherein a gelling agent or a binding agent may optionally be added to the slurry of step c.).

It is an embodiment of the present invention, wherein the gelling agent is selected from the group consisting of hydrogels, rigid gels, and elastic gels.

Yet another embodiment of the present invention includes having the binding agent being a polymer having a molecular weight of at least 300 atomic mass units.

It is another embodiment of the present invention, wherein an emulsion is formed.

An embodiment of the present invention includes having a composition for training and evaluating creatures and calibrating devices that detect explosives comprising a scent simulant that includes an explosive material formed within the interstices of a density controlling material.

It is an embodiment of the present invention, wherein the explosive material is at a concentration that is non-detonable.

It is an embodiment of the present invention, wherein the scent simulant is a product of an acid catalyzed reaction between an organic compound, an oxidizing agent, a nitrating agent, or any combinations thereof.

It is an embodiment of the present invention, wherein the detector creatures are selected from the group consisting of mammals, birds, insects, and fish.

It is an embodiment of the present invention, wherein the calibrating devices includes vapor detecting instruments.

It is an embodiment of the present invention, wherein the vapor detecting instruments are selected from the group consisting of gas chromatographs, flame ionization spectroscopy, UV-Vis spectroscopy, Near InfraRed spectroscopy, Mid Infra Red spectroscopy, Far Infra Red spectroscopy, THz spectroscopy, nuclear spectroscopy, Mass spectroscopy, Fluorescence/Phosphorescence spectroscopy, or any combinations thereof.

It is an embodiment of the present invention, wherein the density controlling material may be from about 60% to about 99.5% by weight when compared to the weight of the explosive material within the density controlling material's interstices.

It is an embodiment of the present invention, wherein the composition may include from about 0% to about 40% water by weight of the total composition.

It is an embodiment of the present invention, wherein the composition is safely transportable.

It is an embodiment of the present invention, wherein the scent simulant comprises TATP and diatomaceous earth in a ratio ranging from about 40:60 to about 1:99 respectively.

It is an embodiment of the present invention, wherein the scent simulant comprises HMTD and diatomaceous earth in a ratio ranging from about 40:60 to about 1:99 respectively.

It is an embodiment of the present invention, wherein the scent simulant comprises TATP, saw-dust, and water in ratios ranging from about 25:70:5 to about 5:70:25 respectively.

It is an embodiment of the present invention, wherein the scent simulant comprises HMTD, saw-dust, and water in ratios ranging from about 25:70:5 to about 5:70:25 respectively.

Still another embodiment of the present invention includes having a scent simulant comprising TNT, diatomaceous earth, and water in ratios ranging from about 25:70:5 to about 5:70:25 respectively.

Another embodiment of the present invention includes having the scent simulant comprising PETN and diatomaceous earth in ratios ranging from about 40:60 to about 1:99 respectively.

Yet another embodiment of the present invention includes having a scent simulant comprising PETN, diatomaceous earth, and water in ratios ranging from about 25:70:5 to about 5:70:25 respectively.

It is an embodiment of the present invention, wherein the scent simulant comprises RDX and diatomaceous earth in ratios ranging from about 40:60 to about 1:99 respectively.

It is an embodiment of the present invention, wherein the scent simulant comprises RDX, diatomaceous earth, and water in ratios ranging from about 25:10:5 to about 5:70:25 respectively.

It is an embodiment of the present invention, wherein the scent simulant comprises DNT and diatomaceous earth in ratios ranging from about 40:60 to about 1:99 respectively.

It is an embodiment of the present invention, wherein the scent simulant comprises DNT, diatomaceous earth, and water in ratios ranging from about 25:70:5 to about 5:70:25 respectively.

Still another embodiment of the present invention includes having a scent simulant comprising potassium nitrate and diatomaceous earth in ratios ranging from about 40:60 to about 1:99 respectively.

Yet another embodiment of the present invention includes having a scent simulant comprising ammonium nitrate and diatomaceous earth in ratios ranging from about 40:60 to about 1:99 respectively.

Still further, the present invention includes having a scent simulant comprising nitroglycerin, diatomaceous earth, and water in ratios ranging from about 25:70:5 to about 5:70:25 respectively.

It is an embodiment of the present invention, wherein the scent simulant comprises potassium chlorate, diatomaceous earth, and water in ratios ranging from about 25:70:5 to about 5:70:25 respectively.

Another embodiment of the present invention includes having a scent simulant comprising urea nitrate, diatomaceous earth, and water in ratios ranging from about 25:70:5 to about 5:70:25 respectively.

Therefore, it is within the scope of the present invention to provide scent simulants that mimic the odors of live explosives and a method for making the same. Other features and advantages of the invention will be apparent from the following detailed description.

DEFINITIONS

For the purpose of detailing the present invention, the following non-limiting words are used.

The term "scent simulant" refers to a material that produces a scent that so similar to the material it is supposed to simulate that neither scent can be differentiated from one another by a scent detecting creature or a scent detecting analytical instrument. Such a scent simulant can also be referred to as an odoriferous equivalent of the material it is supposed to simulate.

The term "slurry" refers to a suspension of non-soluble solids within a liquid medium.

The term "porosity" refers to voids and spaces within a material.

The terms "odors" and "scents" refer to volatile chemical compounds that produce smells which humans and other living things can perceive through the use of their sense of olfaction.

The term "inert" refers to being non-reactive, either chemically or energetically.

The term "density controlling material" refers to any porous material that is chemically inert to the precursors of explosive materials, to explosive materials, and which can be used to control the degree of crystallinity, packing density and solid state properties of explosive materials formed within its pores and interstices.

The term "entropy burst explosives" refers to a group of chemical compounds that explode as a result of a facile and spontaneous decomposition of their molecular structure and a transformation of chemical state from the solid state to the gaseous state.

The term "detonable explosives" refers to chemical explosive materials that explode through a detonation process.

The term "solid state properties" refers to the structure and the physical properties of a solid material. Such properties include purity, degree of crystallinity, the type of crystal structure, dimensions, packing density and interlattice spacing.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

The accompanying drawing, FIG. 1 depicts a schematic for the method for making a scent simulant that simulates the odors of detonable and entropy burst chemical explosive materials.

DETAILED DESCRIPTION OF THE INVENTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Background" and "Summary") and sub-headings used herein are intended only for general organization of topics within the present disclosure, and are not intended to limit the disclosure of the technology or any aspect thereof. In particular, subject matter disclosed in the "Summary" is not an exhaustive or complete disclosure of the entire scope of the technology or any embodiments thereof.

Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the Introduction is intended merely to provide a general summary of assertions made by the authors of the references, and does not constitute an admission as to the accuracy of the content of such references. All references cited in this specification are hereby incorporated by reference in their entirety.

From this point forward, the following words will describe a method of making scent simulants that mimic the odors of explosives. These compositions, which will also lack the transportation, handling and storage hazards of chemical explosive materials, may be used as training aids within biological search-and detect chemical explosive detection programs, and in the calibration of explosives detecting instrumentation that are based on the principles of headspace vapor analysis.

Introduction

The threat of terrorist activities towards US concerns at home and abroad, has made explosives detection a priority in effecting the protection of our infrastructure and citizenry. Even with all the technology available for explosives detection, canines offer the advantage of being the least costly and most reliable explosives search-and-detect tool.

With a known detectability range of parts-per-billion and an assumed detectability range in parts-per-trillion, a canines' sense of smell that equals the best scent detection instrumentation, and they have been used to perform various forms of scent-based search-and-detect work such as searching for missing or injured persons, narcotics and drugs, arson and incendiary devices, explosives and mines.

Unlike the point-detection ability of explosives detection instruments, biological detectors such as canines are still the only detectors able to detect a scent and track it to its source; thus, the name search-and-detect. However, even with such superb discriminatory capacity, explosives-detecting dogs (EDDs) fail to detect a small-but-significant percentage of explosives during their search process. This is because there are still a lot of explosives that are not available for use as training aids, and are therefore not used within a canine detection program. In order to increase the efficiency and scope of detection of EDDs and other explosives detecting creatures, training aids that cover the whole spectrum of available explosives are needed.

Types of Explosive Materials

There are different kinds of explosives materials, examples of which include chemical, nuclear and electromagnetic explosives. A chemical explosive material is an energetic material that can be initiated to undergo an expansion decomposition that is usually accompanied by the production of heat and increases in pressure.

Chemical explosives are usually classified as low or high explosives according to their rates of decomposition. Low explosives deflagrate or burn rapidly, while high explosives undergo detonations. However, in sufficient quantities, low explosives can undergo detonations like high explosives.

In this invention chemical explosives are preferably classified not on their rates of decomposition but on their on their mechanism of decomposition. Using this classification method, chemical explosives can be divided into two types: those that explode through detonation and those that explode through entropy burst.

Detonable Chemical Explosive Materials

"Detonation" is used to describe an explosive phenomenon whereby the decomposition occurs as a result of a series of chemical reactions initiated by an applied shockwave that transverses through the material, which then progresses into a self-sustained exothermic reaction. When these shock velocities are sufficiently high, the dislocations can have energy adequate to directly pump the internal vibrational modes of the constituent molecules (C. S. Coffey, *Phys. Rev. B* 24, 6984 (1981); C. S. Coffey, *Phys. Rev. B* 32, 5335 (1984); C. S. Coffey, *J. Appl. Phys.* 70, 4248 (1991).).

These chemical reactions and subsequent explosions are typically as a result of the participation of energetic —$NO_2$ groups that are present within the molecular structure of the material. In most cases the energetic —$NO_2$ groups are appendaged to the molecular structure of the material, rather than being an integral part of the primary skeleton of the material itself. The explosive power of a detonable material is typically determined by the ratio of the energetic groups to non-energetic groups within the molecular structure of a material. It is also determined by the interplay of intermolecular interactions within individual molecules of this material within a solid, which pertains to solid state factors such as the crystallinity and packing density of the material.

Thus, in order to impart a propensity for detonation unto a compound or material, thereby converting a compound or material into a detonable explosive energetic nitro groups can be incorporated into the material through a synthetic process known as nitration. The process of nitration is a substitution reaction and normally, a pendant hydrogen atom, otherwise called a proton, bonded to carbon or a heteroatom such as nitrogen or oxygen, is extracted from the chemical structure of a compound and replaced by the —$NO_2$ group. Common examples of detonable chemical explosives include TNT, RDX, PETN, nitromethane, hexanitrostilbene, and nitrocellulose. Some of these explosives are shown in Table 1.

TABLE 1

Chemical structures of some detonable explosives

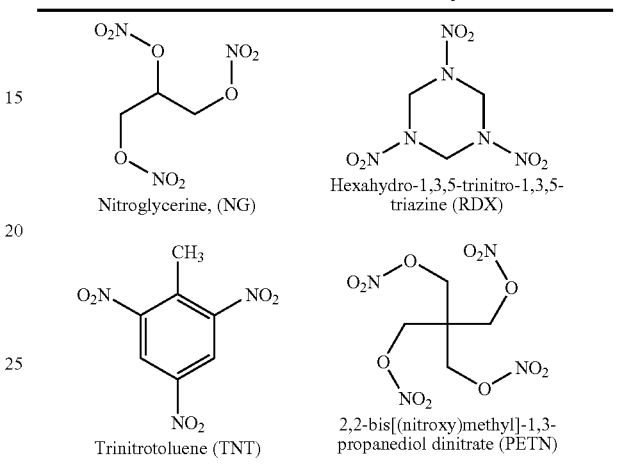

There are many reagents capable of nitration and the most commonly used nitration agents are nitric acid and its combinations with other acids or oxidants. Depending on the weight of a molecule and the number of protons available for substitution, two, four, six or more of these —$NO_2$ groups may be required on the molecular skeleton of an organic compound in order to impart explosive properties. Ammonia, a very low molecular weight, gaseous compound requires one nitro group in order to become the explosive ammonium nitrate. Benzene an aromatic hydrocarbon with six skeletal hydrogen atoms within its molecular structure requires the substitution of three of these hydrogen with nitro groups to acquire an explosive property; toluene, an aromatic hydrocarbon with eight hydrogen atoms, five of which are within its molecular skeleton, requires the substitution of three of its skeletal hydrogen with nitro groups to become the explosive known as TNT; and stilbene, also an aromatic hydrocarbon, requires the substitution of six of twelve available skeletal protons to become the explosive hexanitrostilbene, HNS.

Aliphatic compounds with skeletal alcohol OH groups usually require a substitution of the protons of all their hydroxyl groups, with a nitro group, to acquire an explosive property. Thus polyols such as pentaeritol with four labile hydroxyl groups within its molecular structure requires the substitution of each of these protons of each OH group with a —$NO_2$ group to become the explosive PETN; glycerol and ethylene glycol also require the substitution of all their labile hydroxyl protons to become the explosive materials known as trinitroglycerine and ethylene glycol dinitrate (EGDN) respectively.

Aliphatic compounds functionalized with amino $NH_2$ usually require a substitution of their amino protons with a nitro group. Thus all the amino protons in the explosive RDX are substituted with a $NO_2$ group.

For aromatic compounds, the presence of amino and hydroxyl group within the chemical structure also activates the molecule itself towards nitration of the aromatic skeleton.

If a molecule does not have a hydrogen atom within its structure with which to substitute for nitro groups, then it will not be able to incorporate a nitro group into its structure and will not be able to have the energy to become explosive in character.

Sometimes, facile chemical conditions used are not strong enough to force the nitration of a compound to the extent that it will have explosive properties. This condition might be due to steric or electronic factors that present an activation barrier to the nitration process. It becomes progressively difficult to add successive amounts of nitro groups to a compound at room temperature, so the input of heat is normally involved in the nitration process. After the nitration process, microscopic factors such as intermolecular geometry, intermolecular distances of crystals and crystal-lattice continuity of the molecules and macroscopic factors such as purity and crystallinity of the bulk material make up the mechanochemical properties that will dictate the ability of a material imparted with explosive properties, to detonate.

Since detonable explosives normally have an endothermic initial step of ignition, they need to be ignited by an input of energy, such as a shockwave. This need accounts for their relative stability and the ease at which scent simulants can be made from them using known methods of physical mixing. However, the scent signature of such scents still contain the solvents used to make slurries out of these explosives, which, as in all cases of prior art, were not the solvents used in the manufacture of the explosives.

Entropy Burst Chemical Explosive Materials

Unlike detonable explosives, entropy burst explosives are a class of highly unstable, high explosive materials that undergo explosive decomposition without the aid of a detonation or shockwave, but through the spontaneous dissociation, or "bursting-apart" of its molecules, leading to spontaneous material dissociation from a solid state to the gaseous state and the concomitant release of tremendous amounts of pressure (F. Dubnikova, R. Kosloff, J. Almog, Y. Zeiri, R. Boese, H. Itzhaky, A. Alt, and E. Keinan, *J. Am. Chem. Soc.*, 121, 1146-1159 (2005)).

Also unlike explosion through detonation, where the chemical reactions generated by the shockwave are accompanied by the evolution of heat, there is very little heat evolved in an entropy burst explosion.

The property of spontaneous molecular dissociation that characterizes entropy burst explosives can be attributed to the instability of the molecular structure of these compounds, which, in turn, is caused by the presence of unstable low energy bonds within the structural framework of the molecule. These instabilities are further enhanced by the presence of steric and conformational strain within the structural framework.

With such instabilities, entropy burst explosive are highly sensitive to shock, heat, and friction and represents that reason why they have been left alone, for all these years, by both industry and the military (J. Köhler and R. Meyer, *Explosives*, VCH, 4th edition, 1993). However because they are cheaper to make, the starting materials are easier to acquire and they do not typically need heat for their syntheses, entropy burst explosives have gained a renaissance within international terrorists. The need for scent simulants of entropy burst explosives cannot be overemphasized.

An example of an entropy burst explosives are the organic peroxides. Organic peroxides are a class of chemical compounds that typically contain one or more R—O—O—R functional groups (D. Swern, Organic Peroxides Volume III, Wiley, New York, 1st edition, (1972)). They are often made by the simple reaction between a peroxide such as hydrogen peroxide and a ketone such as acetone, in the presence of an acid catalyst. The low bond energy of the oxygen-oxygen O—O bond within the molecular structure of the engendered material results in structural instability of the molecule. This, in turn, leads to a very high sensitivity of the molecule and its susceptibility to spontaneous decomposition through friction, shock, and sublimation. While organic peroxides can be linear or cyclic, cyclic peroxides are more sensitive than linear ones. Also, an increase in the number of the low bond energy oxygen-oxygen bonds increases the instability of the material.

Triacetone triperoxide (TATP), an example of an organic peroxide entropy-burst explosive, is a highly sensitive explosive compound that can be easily made from the simple combination of acetone, hydrogen peroxide and sulfuric acid, all of which are components that can easily be obtained from a home improvement or hardware store. Being a cyclic triperoxide with three O—O bonds, the structural instability of TATP arises from the inherent instability of these bonds within its structural framework, plus the additional strain imposed on these bonds by the cyclic nature of the structure. Without the need or use of a detonator, TATP can spontaneously explode at room temperature to produce an outward-pushing blast pressure that is 80% more powerful than TNT, with little production of heat. The structure of TATP and some other organic peroxide explosives are depicted in Table 2.

TABLE 2

The chemical structures of some entropy-burst explosives

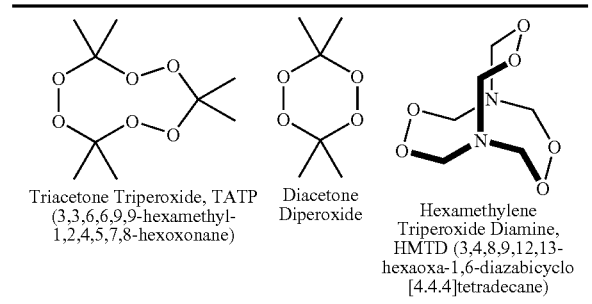

Triacetone Triperoxide, TATP (3,3,6,6,9,9-hexamethyl-1,2,4,5,7,8-hexoxonane)  Diacetone Diperoxide  Hexamethylene Triperoxide Diamine, HMTD (3,4,8,9,12,13-hexaoxa-1,6-diazabicyclo[4.4.4]tetradecane)

Although more unstable than nitroglycerin, the explosive power of TATP, its ease of manufacture and cheap cost of materials needed for its syntheses has made it an all-popular explosive-of-choice for terrorists worldwide. As an added benefit to these terrorists, TATP cannot be detected by any of the non-invasive explosive detection methods currently being used within at airports and border checkpoints worldwide. This is because its chemical structure does not include nitrogen, N, an element that is a typical component of the energetic $NO_2$ group of detonable explosives and which most analytical instruments are calibrated to seek.

Due their transparency to instrumentation, canine detection remains a major method for the detection these explosives. However, there are no scent simulants of entropy burst explosive currently available for scent detection training activities or for the routineous calibration of instrumentation that may be aimed for their detection. Existing methods of making scent simulants of detonable explosives involves subjecting the actual explosives to a mechanical mixing protocol that cannot be applied to the production of scent simulants for extremely sensitive explosives.

The present invention discloses methods that can be used to produce compositions of scent simulants of detonable and entropy burst explosives. Such compositions will lack the handling and storage hazards of chemical explosive materials be used as training aids for biological search-and detect chemical explosive detection, and in the calibration of explosives detecting instrumentation that are based on the principles of headspace vapor analysis.

General Method of Making Scent Simulants of Explosive Materials

A method for producing an energetically inert explosive scent simulant comprising:

a) chilling a solution of non-explosive reactants to between 2 to 15° C.;
b) optionally adding an oxidant;
c) adding a solid density controlling material to form a slurry;
d) adding an acid to the cooled slurry to in situ produce an explosive scent simulant;
e) after a mixing period, optionally diluting the slurry with water;
f) filtering the slurry to collect the explosive scent simulant;
g) optionally rinsing the explosive scent simulant.

The minimum amount of energy necessary to initiate an explosion from an explosive material depends on the critical mass of the material, the inherent energy of the material, its purity, crystallinity, and packing density. For example, several directions of shock impact that will not cause detonation to PETN, even when the shock wave fully crosses the crystal (Zaoui, A.; Sekkal, W. Solid State Commun. 118, 345-350 (2001)). Also, a single critical mass cannot cause an explosion if it cannot undergo explosion multiplication.

Due to the confining properties of the pores and intestacies of the density controlling material added to the reaction in step C, the solid state properties of the explosive product precipitated within the interstices of the density controlling material are such that:

A. molecular strains inherent within the structural framework of the product explosive material are reduced, due to the presence of a heterogeneous substrate surface that allows the material being formed to adopt those low-energy conformations that result in a decrease in molecular strain of the formed particulates;
B. a regular solid-state pattern is disallowed due to the compartmentalization of the bulk of explosive product material formed within the individual pores of the material. Continuity of a crystalline lattice is further hampered by the formation of inclusions and dislocations within the solid state pattern of each compartmentalized precipitated product;
C. the packing density of the explosive material formed is reduced due to porosity-defined compartmentalization of the material, and the presence of heterogeneous impurities within the reaction medium;
D. the explosive material is highly dispersed within the interstices of the density controlling material, and also very highly diluted by a high fractional quantity of the density controlling medium within which it is present, and,
E. the density controlling material additionally forms a barrier against detonation transfer and attenuates shock through the bulk.

Adjustments of the kinetic parameters of the synthetic process such as the adjustments in the concentration of the reactants, the temperature of the reaction, time allowed for the reaction, pH of the reaction, type of acid used, surface area of the density controlling matrix used within the reaction, the percentage of product formation allowed, and the mixing speed—if any—of the reaction, can be further adjusted to allow the formation of random inclusions and dislocations within the lattice of the compartmentalized product molecules. These inclusions and dislocations within the solid state structure of a material destroys crystal lattice order, long range molecular ordering and will help to make the product act like its own impurity.

All these factors change the mechanochemistry of the material at a nanostructural level, and in a manner that renders the material non explosive, and, since the density-controlling matrix itself is non-odoriferous and non-reactive towards the explosive being formed within it, the scent signature of the intercalated explosive material is retained as the characteristic of the scent simulant.

Thus, using this method, a scent simulant comprising 6 pounds of an explosive material formed, in-situ, within the interstitial area of 100 pounds of a non-odoriferous density controlling material will not have the explosive properties of 6 pounds of the same explosive in a pure, crystalline and compacted form; however, it will have the same headspace scent signature as the parent explosive, and the strength of this scent signature can be further adjusted by simply changing the exposed surface area of the scent simulant.

The explosive scent simulants produced by this method are also suitable for use within both biological detection programs such as canine explosives detection, the training of bees, and in non-biological detection programs such as the calibration of explosives detecting instrumentation.

However, these words are not a limitation on the scope of the present invention, but are merely used to detail certain embodiments thereof.

Method for Making Scent Simulants of Detonable Chemical Explosives

In most instances, the process of nitration is what turns a chemical compound into a detonable explosive. Most detonable explosives currently used today are energetic materials that have incorporated the nitro group as the energetic, fuel-providing source, into their molecular structure. With this realization, the syntheses of a scent simulant of a detonable explosive material, such syntheses involves the nitration of its non-nitrated or non-explosive mono-, di-, or poly-nitrated precursor, in the presence of a density confining matrix, using normal methods of nitration. In the preferred embodiment, explosive scent simulants of detonable explosives are fabricated through the reaction between a non-explosive reactant and an acid or acid mixture, within a matrix that confines the particulate properties of the formed product to the dimensions of the interstices of the matrix. Using the FIG. 1 to further explain the art, a non-explosive reactant 62 is chilled, stirring is commenced, and a non-reactive density controlling material 65 is added to form a non-homogeneous mixture 66. Chilling is advised since the introduction of the density controlling material can be an exothermic process in itself. A nitrating acid or acid mixture 67 is then added. Typically a low temperature of between 0° C. and 15° C. is maintained during the process of adding the acid since the addition of the first nitro group to the reactant 62 could be an exothermic process. The addition of the acid is also done slowly in order to maintain a low stable temperature and prevent the occurrence of a runaway reaction. After the complete addition of the acid, the mixture can then be heated to a temperature that will force the polynitration process that typically leads to the formation of the explosive material. The whole is stirred for a period ranging from 4 to 48 hours, and filtered. Elevated temperatures of between 45° C. to 115° C. can be used during this heating period depending on the intended forcefulness of the nitration process. In this embodiment 67 serves as both a solvent and a nitrating reagent for 62. To serve both purposes at least a 1:10 stoichiometric ratio of 62:67 is preferably used. The reaction time and the temperature used determine the yield and mechanochemical quality of the product. The product 68 can the filtered from the solution and dried for use as a simulant.

Alternatively, since polynitrated products are insoluble in water, the addition of water to the acidic solution before the filtration process forces the precipitation of more product from solution, increasing the yield.

Alternatively, 68 can be rinsed with water, or rinsed an aqueous solution of an inorganic base such as aqueous sodium bicarbonate, sodium hydroxide or potassium hydroxide in an attempt to neutralize the material prior to being dried and used as a scent simulant.

It is important within this process that the stoichiometry of the reactants used is calculated such that the density controlling material constitutes 40 to 99.55% of the total product mass. The mechanochemical properties of the product formed 68 plus its high dilution by the matrix material renders it non-explosive but suitable as a scent simulant.

The non-explosive reactant 62 can be of the general chemical formula R, where R is a hydrocarbon. Hydrocarbons are compounds that contain only carbon and hydrogen molecules. They can be straight chained (propane) or cyclic (cyclohexane), aliphatic (e.g., hexane) or aromatic (e.g., toluene, naphthalene, stilbene). R can also be saturated, in which all the carbons within the structure are of $sp^3$ character, unsaturated where some of the carbons have either $sp^2$ or sp character, linear or branched.

The non-explosive reactant 62 can also be an alcohol. An alcohol is an organic compound with the general formula R—OH, where R is a hydrocarbon. Alcohols can be straight chained (such as butanol), cyclic (such as cyclohexanol), aliphatic (such as glycerol) or aromatic (such as phenol). R can also be saturated, unsaturated, linear or branched, and have more than one alcohol group (such as in ethylene glycol).

The non-explosive reactant 62 can also be an amine. An amine is an organic compound with the general formula R—$NH_2$, where R is a hydrocarbon. Amines can be straight chained (such as hexamine), cyclic (pyrimidine), aliphatic or aromatic (aniline). R can also be saturated or unsaturated, linear or branched, and have more than one —$NH_2$ group (such as phenylenediamine).

The use of an oxidant 63, is ordinarily unnecessary during the syntheses of the scent simulant of a detonable explosive. The acid reactant 67 can be any acid capable of nitrating 62. Typically, the nitro group adds on to the chemical structure though a substitution of the hydrogen present on either a carbon, oxygen or nitrogen atom within the structural framework, displacing a hydrogen atom. Non-limiting acids used in nitration include nitric acid, mixed acid systems such as nitric/suphuric, nitric/acetic acid, and nitric acid/ammonium nitrate, and acid salts such as nitronium tetrafluoroborate and urea nitrate.

Method of Making the Scent Simulants of Entropy Burst Chemical Explosives

In the preferred embodiment a non-explosive scent simulant of an entropy burst explosive is fabricated through the acid catalyzed reaction between a non-explosive reactant and an oxidizing reagent within a matrix that modifies the particulate properties and nullifies the explosive properties of the formed product.

Using the FIG. 1 to further explain the art, a cooled non-explosive reactant 62 and an oxidant 63 are combined to form a mixture 64. The non-explosive reactant 62 can be a ketone. A ketone is an organic compound with the general formula $R_1R_2$(C═O) where R is an hydrocarbon residue. A ketone can be aliphatic (such as acetone), cyclic or aromatic (such as acetophenone). R can also be saturated, unsaturated, linear or branched, or have more than one ketone (C═O) group.

The non-explosive reactant 62 can also be a diamine. An diamine is an organic compound with the general formula $NH_2$—R—$NH_2$, where R is an organic residue which could be aliphatic (such as hexamine), cyclic, or aromatic (such as phenylenediamine). R can also be saturated, unsaturated, linear or branched, and may have more than two amino groups.

The oxidizing reagent 63 can be a peroxide. Non-limiting examples of inorganic peroxides include hydrogen peroxide, sodium peroxide and calcium peroxide. Typically, hydrogen peroxide is the oxidizing agent preferably used in the formation of the peroxide family of entropy burst explosives.

In a typical process illustration, and as depicted in FIG. 1, a chilled solution of a 63 is added to a chilled and stirring solution of 62 in a manner that the temperature of the mixture does not exceed 15° C. Typically a molar ratio of 1:1 of 62:63 is required; however, one of the two reactants can be added in excess so that it also serves as a solvent. The selection of which of the two to use as solvent can be based on factors such as the relative toxicity of both reactants to each other, physical state (it is better to use a liquid in excess than a solid), solubility in the aqueous media used for the rinsing process, ease of removal by rinsing, and cost. The resulting mixture 64 is chilled, and then a non-reactive density controlling material 65 is added to the mixture. As a result of this addition, a portion of 64 is absorbed within the matrices of the density controlling material to form non-homogeneous slurry, 66. Acidification of the cooled stirring slurry by an acid, 67, initiates the chemical reaction between 62 and 63 to form an entropy burst explosive scent simulant.

During the formation of a scent simulant for an entropy burst explosive, 67 simply serves as an acid catalyst for the reaction between 62 and 63 and is not a major reactant. The acid reactant 67 may be an inorganic or organic acid. An organic acid can be acetic acid, citric acid, phosphoric acid, peracetic acid, phosphorous acid, adipic acid, malic acid, phthalic acid, oxalic acid, succinic acid, sorbic acid, cinnamic acid, benzoic acid, hydroxybenzoic acid, muriatic acid, sulfamic acid, tartaric acid, glucuronic acid, or mixtures thereof. Inorganic acids can include, for example, hydrochloric acid, sulfuric acid or nitric acid. In some cases, acidification with 67 can be carried out before the addition of the density controlling material 65.

The stoichiometry of the simulant components should be such that the yield of the final product formed is so diluted by the available density controlling material that explosive decomposition is impossible. Typically, the ratio density controlling material used within the process is calculated in a way that it constitutes between 70% to 99.5% of the total product mass.

The whole is stirred for a period ranging from 4 to 48 hours, at temperatures ranging from 0-15° C. The reaction time and the temperature used determine the yield of the product while the temperature used is also one of the determinants of product mechanochemical quality.

After a predetermined mixing time, the product 68 can the filtered from the solution and dried for use as a simulant. Alternatively, it can be rinsed with water, or rinsed an aqueous solution of an inorganic base such as aqueous sodium bicarbonate, sodium hydroxide or potassium hydroxide in an attempt to neutralize the material, prior to being dried and used as a scent simulant. The solid state properties of the product formed 68 plus its high dilution level renders it non-explosive but suitable as a scent simulant.

Methodology Considerations General to the two main methods, the non-reactive density-controlling material 65 can be any porous material that is inert to the reactivity's of 62, 63, 67, 68 and to the envisaged product material. Depending on the characteristics of the explosive being simulated, density controlling materials that can be used include zeolites, clay, silica, saw-dust, diatomaceous earth, odor free cellulose, porous glass beads, glass fibers, plant-derived matter such as saw-dust and nut shells, calcium carbonate, talc, kaolin, mica, barium sulfate, metal oxides and hydroxides, carbon black, graphite, wood flour and flours or fibers of other natural products, synthetic fibers, natural polymer gums, synthetic polymers gums, starches, starch derivatives. The microstructure of the matrices may be such that it is amorphous or defined. Additionally, the density controlling material can be selected to encapsulate the product, when formed.

The properties of the product can also be further fine-tuned by the preselection of a density controlling material of predefined pore size and degree of porosity. The pore size of the density controlling material can range between 1 angstrom to 100 microns and its porosity can range between 1-98%. The density controlling material can also be used to control particle size distributions and determine if the material formed will be sub-nanodispersed, nanodispersed or micro dispersed.

Matrices may sometimes be selected to have a catalytic function in addition in being a density confiner and a dispersant. In some instances, during the formation of scent simulants of detonable explosives, a catalyst can be used to generate intermediate reactant(s) for the nitration process. This will find particular use in processes that attempt to broaden the scope of detonable materials represented by a single scent simulant. Thus, for example, a porous matrix comprising of supported iron(III) ions on neutral γ-alumina will be an efficient catalyst for a low temperature oxidation of aromatic hydrocarbons such as of benzene, toluene, chlorobenzene, p-xylene, mesitylene, and Benzaldehyde, in the presence of 63. The products realized from such a process can then be polynitrated all at once, by the addition of a strong nitrating acid such as nitric acid.

In some cases the introduction of moisture into 68 will be desirable to maintain the mechanochemical properties of the intercalated material or increase the intensity of expelled scent. A hygroscopic (moisture absorbing) density confining matrix material can be used.

The solid state properties of the product formed can further be modulated by the kinetic parameters used within the synthetic process leading to the formation of the product, through an adjustment of parameters such as the concentration of the reactants, temperature of the reaction, time allowed for the reaction, acidity of the reaction, type of acid used, surface area of the density controlling matrix used within the reaction, and mixing speed of the reaction.

Stirring the reactants during the course of the reaction serves to provide a homogeneous turbulence that prevents the formation of, and break up, any crystals that might otherwise form within the reaction. Since the density controlling material is also insoluble in the solvent used, stirring also serves to help maintain better homogeneity of an essentially heterogeneous reaction mixture, and help increase the surface area of the density containing matrix available for nucleation within the liquid medium. All these increase the probability of product forming within the density controlling material. It will also increase the rate of material inclusions. In addition to, or as an alternative to stirring, ultrasound can also be used as a source of homogeneous turbulence. During such instances, frequency ranges between 10-100 kHz and amplitudes of 0.3-10 m can be used.

The mechanochemical properties of the product material can also be further improved through the addition of other impurities. An impurity can be any material that is non-odoriferous and that is not reactive with either the reactants or products. Such impurities can include other density controlling materials.

Adjustment of Scent Concentration or Longevity

The yield of product formed within the matrix can be controlled by using either 62 or 63 as limiting reagents. The yield of product formed can also be controlled by the type of acid 67 used. For example, during the syntheses of scent simulants of detonable explosive the nitrating process is typically carried out using concentrated nitric acid. In some cases another acids such as concentrated sulfuric acid, acetic acid or acetic anhydride can be added to the reaction to act as a catalyst or other nitrating salts are added to act as a nitrating source. In the syntheses of entropy bust explosive scent simulants, synthesis can be carried out in acetic acid to give higher yields, or in hydrochloric acid to give lower yields. In the formation of TATP scent simulant, a strong catalyst is preferred since less acidic conditions produce more monomeric and dimer analogues.

The yield of the product can also be controlled through an adjustment of the time allowed for the reaction. A longer time increase the amount of materials formed within the density controlling matrix, and increases its percentage composition. The difference between the dry weight of the matrix and any other solid materials used within the heterogeneous mixture during the reaction, and the dry weight obtained from such solids after the reaction is stopped, represents the weight of product material intercalated within the matrices of such solids. Knowledge of the yield and the surface area such yield covers allows for a calculation of loading concentration. Since most of all the explosive materials are insoluble in water, the yield can also be increased by additions water to the reaction mixture before filtration.

Product Recovery

The resultant product 68 can be filtered and optionally rinsed with a variety of solvents, for example, water, aqueous alkali solutions such as 10% sodium hydroxide, potassium hydroxide, sodium bicarbonate, or water miscible solvents such as acetonitrile, methanol and acetone. This product constitutes an explosive scent simulant. In order to increase the intensity of expelled scent 2-30% weight percent of water can be added the product simulant.

The 68 can be vacuum filtered to remove any traces of solvent, unreacted material and liquid by-products. The spent solvents recovered from 68 can be recycled for use, under conditions which avoid or minimize the need for costly recovery steps.

Binding Agents

The explosive scent simulants can be formulated to additionally include a binder. This may be needed in instances where is explosive is required to have a specific shape and/or texture. Such a binder can include a polymer or of monomers capable of forming polymers with molecular weights greater than 300 atomic mass units. The preferable solvent to aid in the binding can be water, or an organic solvent with a boiling point $\leq 75°$ C., for example, methanol, or a combination of two miscible solvents such as water and methanol. To achieve this binding process 68 is blended into a mixable solution of the polymer and the solvent is thereafter evaporated under vacuum. Alternatively 68 can be added into a solution of monomers and then polymerization is initiated. Curing can be initiated using heat, or by using UV or microwave irradiation. Non-limiting examples of binders that can be used include polyethylene (PE), oxidized PE, poly(urethane), cellulose acetate butyrate, poly(vinylidene fluoride-co-hexafluoropropylene), poly(chlorotrifluoroethylene-co-vinylidene fluoride) styrene-1,3-butadiene-acrylonitrile, vinyl propionate-acrylate, dioctyl adipate and polyacrylate polymers.

A gelling agent which forms a gel or emulsion can be added. Mixing can be carried out in a vertical high shear mixer or any other forms of mixing which allow for an intimate mixing of all components.

Such methods can be applied towards the formulation of non-explosive scent simulants for a variety of explosive materials such as 5-nitro triazol-3-one (NTO); trinitrotoluene (TNT); trinitro triamino benzene (TATB); 3,5-dinitro-2,6-bis-picrylamino pyridine (PYX); nitroglycerine (NG); ethylene glycol dinitrate (EGDN); diethylene glycol dinitrate (DEGDN); 2,2-bis[(nitroxy)methyl]-1,3-propanediol dinitrate (or pentaeritol tetranitrate) (PETN); trimethylol ethyl trinitrate (TMETN); tetryl; hexahydro-1,3,5-trinitro-1,3,5-triazine (RDX); methylamine nitrate; octahydro-1,3,5,7-tetranitro-1,3,5,7-tetrazocine (HMX); nitroguanidine; urea nitrate; ammonium picrate; triacetone triperoxide (TATP), diacetone peroxide, tributanone triperoxide (TBTP), hexamethylene triperoxide (HMTD) and mannitol hexanitrate.

Compositions

The inventive explosive scent simulant compositions for detecting explosives can include an explosive contained within a non-reactive density controlling material, wherein the explosive product is formed within the matrix of the density controlling material in desensitized amounts that are so dilute that an explosion of the material impossible. The density controlling material is about 40 to 99.5% of the explosive scent simulant. These compositions can be easily handled, allowing safe transportation and storage. Using these compositions with an appropriate training regime increase the range of explosives detectable by explosive detecting dogs and will allow the routine calibration of detection instruments that operating on the principles of vapor sampling. The compositions may be used to train other search-and-detect biological detectors for example, bees, rodents and dolphins.

Explosives Detection Training Kit

An explosives-detection training kit is contemplated which includes a composition including an explosive material contained within a density controlling material, wherein the explosive material is formed within the matrix of the density controlling material, in amounts that are so dilute that explosive decomposition is impossible, and a container retaining the composition.

EXAMPLES

Now that the present invention has been generally described, the following non-limiting examples are set forth to fully detail methods of making scent simulants. However, these examples are not to be construed as a limitation on other ways of making the present invention. Embodiments clear to one of ordinary skill in the art to make scent simulants accordingly are within the scope of the present invention.

Example 1

Preparation of a TATP Scent Simulant

A TATP explosive scent simulant was prepared by the following chemical reaction and physical control of mechanochemical properties of the product. An amount of 11.2 g of chilled acetone (0.2 mol) was mixed with chilled hydrogen peroxide (30% in water, 60 mL, 0.5 mol), and the mixture was cooled to 0° C. temperature. In the next step, 12 g of diatomaceous earth was added to the mixture and stirring was commenced, whilst cooling. Concentrated sulfuric acid (12 drops) was added to the stirred slurry. The whole mixture was stirred for an additional 6 hours using a magnetic stirrer and then kept in a refrigerator for 16 hours without stirring. The resultant precipitate was collected by filtration with suction. It is then rinsed with cold water and air-dried to afford a dry weight of 16 g of white material. This represents 4 g of TATP intercalated within the diatomaceous earth.

To assess the specificity of the material as a TATP scent simulant, 10 g of the product formed was put into a 3"×5" bag made of cheese cloth presewn on three sides. After the addition of the product, the fourth side was sewn, and the whole was tested for applicability as a scent simulant by subjecting it to canine search-and-detect explosive detection tests, using canines trained and certified in explosives detection and also experienced in TATP detection.

In the first instance, the scent was placed within a 50,000 sq ft warehouse fully stocked with electrical appliances and home improvement materials. The specific placement areas were unknown to the handlers. After the bag had been left for a period of ten minutes in order to allow the permeation of their vapor into the surroundings, each canine was brought in by its handler, one canine/handler team at a time, to fully roam the warehouse and search-and-detect the simulant as a TATP explosive. At this stage, the handler released the canine to allow it to roam the warehouse unrestricted, and with his instructions the canine started systematically searching the warehouse, with no time constrictions imposed on the team.

The two canine/handler teams used in this study successfully detected the simulant, which was placed within the compressor of a double-door refrigerator that was still in its packaging. When the canines got to the area where the simulant was placed, they both showed behavioral cues normally associated with finding an explosive material, which was sitting down next to the box without nudging it, to indicate the presence of a scent similar to that of an explosive scent that they had been trained to detect.

A qualitative evaluation of the sensitivity and stability of the simulant showed that it is insensitive to impact, spark, friction, temperature, and shock. Attempts to explode the material through the application of force provided by a 200 lb metal brick traveling a distance of 6 feet to strike an object 5" by 3", placed between two metal (steel) plates, did not cause an explosion of the material or any deformation of the plates. A repetition of the experiment in the dark, and using a CCD camera to monitor the process, showed that the shock impact did not result in the formation of sparks. Compression of the substance with a KBr press resulted in the formation of a compressed disc and no explosion. Attempts to burn the material using a flame provided by a bunsen burner proved unsuccessful. Heating the materials to 200° C. and maintaining this temperature for 30 minutes, did not cause an explosion.

Example 2

Preparation of a HMTD Scent Simulant

A HMTD explosive scent simulant was prepared by the following chemical reaction and physical control of the mechanochemical properties of the product. Hexamine (7 g) was added to a stirring solution of 1 25 ml 30% $H_2O_2$ that was cooled to 0° C. in a salt ice-bath. Diatomaceous earth (14 g)

was added to the mixture and stirring with continued cooling. After a period of ten minutes, 10 g of citric acid was added in portions, while stirring, maintaining a temperature of 2° C. for 3 hours. The solution was then stirred for 24 hours with the cooling removed. The resultant precipitate was collected by filtration with suction. It was then rinsed with 200 ml cold water (twice), 100 ml 5% sodium bicarbonate solution (twice), and again with 200 ml cold water (twice) and then with methanol. It was then rinsed with cold water and air-dried to afford a dry weight of 20 g of white material. This translates to a yield of 58% of intercalated HMTD. The whole was further diluted by adding an additional 5 g of diatomaceous earth.

To assess the specificity of the material as a HMTD scent simulant, 10 g of the product formed was put into a 3"×5" bag made of count cheese cloth presewn on three sides. After the addition of the product, the fourth side was sewn, and the whole was tested for applicability as a scent simulant by subjecting it to canine search-and-detect explosive detection tests, using canines trained and certified in chemical explosives detection and also experienced in HMTD detection.

In the first instance, the scent was placed within a 50,000 sq ft warehouse fully stocked with electrical appliances and home improvement materials. The specific placement areas were unknown to the handlers. After the scent bags had been left for a period of ten minutes in order to allow the permeation of their vapor into the surroundings, each canine was brought in by its handler, one canine/handler team at a time, to fully roam the warehouse and search-and-detect the simulant as a HMTD chemical explosive. At this stage, the handler released the canine to allow it to roam the warehouse unrestricted, and with his instructions the canine started systematically searching the warehouse, with no time constrictions imposed on the team.

The two canine/handler teams used in this study successfully detected the simulant, which was placed within the compressor of a double-door refrigerator that was still in its packaging. When the canines got to the area where the simulant was placed, they both showed behavioral cues normally associated with finding an explosive material, which was sitting down next to the box without nudging it, to indicate the presence of a scent similar to that of an explosive scent that they had been trained to detect.

A qualitative evaluation of the sensitivity and stability of the simulant showed that it is insensitive to impact, spark, friction, temperature, and shock. Attempts to explode the material through the application of force provided by a 200 lb metal brick traveling a distance of 6 feet to strike an object 5" by 3", placed between two metal (steel) plates, did not cause an explosion of the material or any deformation of the plates. A repetition of the experiment in the dark, and using a CCD camera to monitor the process, showed that the shock impact did not result in the formation of sparks. Compression of the substance with a KBr press resulted in the formation of a compressed disc and no explosion. Attempts to burn the material using a flame provided by a bunsen burner proved unsuccessful. Heating the materials to 200° C. and maintaining this temperature for 30 minutes, did not cause an explosion.

Example 3

Preparation of a TNT Scent Simulant

A TNT explosive scent simulant was prepared by the following chemical reaction and physical control of the mechanochemical properties of the product. Diatomaceous earth (20 g) was added to a stirring solution of 60 ml of 95% $HNO_3$ that was cooled to 0° C. in a salt ice-bath. Cooling temperature was maintained and toluene (3 g) was added in portions, while stirring and maintaining a temperature of between 5° C. and 10° C. Stirring continued for 3 additional hours. The temperature was raised to 80° C. for a period of three hours and then stirred for 6 hours with the cooling removed.

The whole was again heated to 90° C. and then a combined solution of 6 ml concentrated sulfuric acid and 8 ml of nitric acid was added to the mixture with stirring. Temperature was maintained for an additional 70 minutes after which it was removed from the water bath and left standing for an additional 6 hours. The resultant precipitate was collected by filtration with suction. It was then rinsed with 100 ml cold water (twice), 60 ml 5% sodium bicarbonate solution (twice), and again with 100 ml cold water (twice). It is then air-dried to afford a dry weight of 25.82 g of white material. The comparison of the yield obtained, 5.82 g, to the yield that can be obtained assuming a 100% yield of the dinitration process to form DNT (6.01 g) or to a 100% yield of the trinitration process to form TNT (7.4 g) indicate a formation of both intercalated DNT and TNT within the interstices of the density controlling material. No purification was necessary since we have previously determined that either DNT or TNT can serve as a scent simulant for TNT.

To assess the specificity of the material as a TNT scent simulant, 20 g of the product formed was put into a 3"×5" bag made of count cheese cloth presewn on three sides. After the addition of the product, the fourth side was sewn, and the whole was tested for applicability as a scent simulant by subjecting it to canine search-and-detect explosive detection tests, using canines trained and certified in chemical explosives detection. In this instance, the material was placed within a 2 acre playing filed. The specific placement areas were unknown to the handlers. After the bags had been left for a period of ten minutes in order to allow the permeation of their vapor into the surroundings, each canine was brought in by its handler, one canine/handler team at a time, to fully roam the field and search-and-detect the simulant as a chemical explosive. At this stage, the handler released the canine to allow them to roam the field unrestricted, and with his instructions the canine started systematically searching the playing field, with no time constrictions imposed on the team.

The three canine/handler teams used in this study successfully detected the simulant. When the canines got to the area where the simulant was placed, they both showed behavioral cues normally associated with finding an explosive material, which was sitting down next to the box without nudging it, to indicate the presence of a scent similar to that of an explosive scent that they had been trained to detect.

A qualitative evaluation of the sensitivity and stability of the simulant showed that it is insensitive to impact, spark, friction, temperature, and shock. Attempts to explode the material through the application of force provided by a 200 lb metal brick traveling a distance of 6 feet to strike an object 5" by 3", placed between two metal (steel) plates, did not cause an explosion of the material or any deformation of the plates. A repetition of the experiment in the dark, and using a CCD camera to monitor the process, showed that the shock impact did not result in the formation of sparks. Compression of the substance with a KBr press resulted in the formation of a compressed disc and no explosion. Attempts to burn the material using a flame provided by a bunsen burner proved unsuccessful. Heating the materials to 200° C. and maintaining this temperature for 30 minutes, did not cause an explosion.

Example 4

Preparation of an RDX Scent Simulant

A RDX explosive scent simulant was prepared by the following chemical reaction and physical control of the mechanochemical properties of the product. Diatomaceous earth (15 g) was added to a stirring solution of 60 ml of 65% $HNO_3$ that was cooled to 0° C. in a salt ice-bath. Cooling temperature was maintained and hexamine (4 g) was added in portions, while stirring and maintaining a temperature of between 5° C. and 10° C. Stirring continued for 3 additional hours. The temperature was briefly raised to 35° C. for a period often minutes and then stirred for 6 hours with the cooling removed. 28 ml of water was added and heterogeneous solution was stirred for an additional 6 hours.

The resultant precipitate was collected by filtration with suction. It is then rinsed with 100 ml cold water (twice), 60 ml 5% sodium bicarbonate solution (twice), and again with 100 ml cold water (twice). It is then air-dried to afford a dry weight of 17.92 g of white material. This translates to a yield of 46% of intercalated RDX.

To assess the specificity of the material as a RDX scent simulant, 10 g of the product formed was put into a 3"×5" bag made of count cheese cloth presewn on three sides. After the addition of the product, the fourth side was sewn, and the whole was tested for applicability as a scent simulant by subjecting it to canine search-and-detect explosive detection tests, using canines trained and certified in chemical explosives detection. In the first instance, the scent was placed within a 50,000 sq ft warehouse fully stocked with electrical appliances and home improvement materials.

The specific placement areas were unknown to the handlers. After the scent bags had been left for a period of ten minutes in order to allow the permeation of their vapor into the surroundings, each canine was brought in by its handler, one canine/handler team at a time, to fully roam the warehouse and search-and-detect the simulant as a chemical explosive. At this stage, the handler released the canine to allow it to roam the warehouse unrestricted, and with his instructions the canine started systematically searching the warehouse, with no time constrictions imposed on the team.

The three canine/handler teams used in this study successfully detected the simulant, which was placed within the compressor of a double-door refrigerator that was still in its packaging. When the canines got to the area where the simulant was placed, they both showed behavioral cues normally associated with finding an explosive material, which was located inside a closed clothes dryer, by sitting down next to the door of the dryer unit without nudging it, to indicate the presence of a scent similar to that of an explosive scent that they had been trained to detect.

A qualitative evaluation of the sensitivity and stability of the simulant showed that it is insensitive to impact, spark, friction, temperature, and shock. Attempts to explode the material through the application of force provided by a 200 lb metal brick traveling a distance of 6 feet to strike an object 5" by 3", placed between two metal (steel) plates, did not cause an explosion of the material or any deformation of the plates. A repetition of the experiment in the dark, and using a CCD camera to monitor the process, showed that the shock impact did not result in the formation of sparks. Compression of the substance with a KBr press resulted in the formation of a compressed disc and no explosion. Attempts to burn the material using a flame provided by a bunsen burner proved unsuccessful. Heating the materials to 200° C. and maintaining this temperature for 30 minutes, did not cause an explosion.

Example 5

Preparation of a PETN Scent Simulant

A PETN explosive scent simulant was prepared by the following chemical reaction and physical control of the mechanochemical properties of the product. Diatomaceous earth (20 g) was added to a stirring solution of 75 ml of 65% HNO3 and 24.8 ml of 96% H2SO4 that was cooled to 0° C. in a salt ice-bath. Cooling temperature was maintained and Pentaerythritol (4 g) was added in portions, while stirring and maintaining a temperature of 0° C. or below for 3 hours. The mixture is then put in a hot water bath and heated to 35° C. for 25 minutes. The solution was then stirred for 6 hours with the cooling removed. 20 ml of water was added and solution was stirred for an additional 5 hours. The resultant precipitate was collected by filtration with suction. It is then rinsed with 70 ml cold water (twice), 50 ml 5% $NaHCO_3$ solution (twice), and again with 200 ml cold water (twice). It is then air-dried to afford a dry weight of 26.32 g of white material. This translates to a yield of 68% of intercalated PETN. The whole was further diluted by adding an additional 8 g of diatomaceous earth.

To assess the specificity of the material as a PETN scent simulant, 20 g of the product formed was put into a 3"×5" bag made of count cheese cloth presewn on three sides. After the addition of the product, the fourth side was sewn, and the whole was tested for applicability as a scent simulant by subjecting it to canine search-and-detect explosive detection tests, using canines trained and certified in chemical explosives detection. In this instance, the material was placed within a 2 acre playing filed. The specific placement areas were unknown to the handlers.

After the bags had been left for a period of ten minutes in order to allow the permeation of their vapor into the surroundings, each canine was brought in by its handler, one canine/handler team at a time, to fully roam the field and search-and-detect the simulant as a chemical explosive. At this stage, the handler released the canine to allow them to roam the field unrestricted, and with his instructions the canine started systematically searching the playing field, with no time constrictions imposed on the team.

The three canine/handler teams used in this study successfully detected the simulant. When the canines got to the area where the simulant was placed, they both showed behavioral cues normally associated with finding an explosive material, which was sitting down next to the box without nudging it, to indicate the presence of a scent similar to that of an explosive scent that they had been trained to detect.

A qualitative evaluation of the sensitivity and stability of the simulant showed that it is insensitive to impact, spark, friction, temperature, and shock. Attempts to explode the material through the application of force provided by a 200 lb metal brick traveling a distance of 6 feet to strike an object 5" by 3", placed between two metal (steel) plates, did not cause an explosion of the material or any deformation of the plates. A repetition of the experiment in the dark, and using a CCD camera to monitor the process, showed that the shock impact did not result in the formation of sparks. Compression of the substance with a KBr press resulted in the formation of a compressed disc and no explosion.

Attempts to burn the material using a flame provided by a bunsen burner proved unsuccessful. Heating the materials to 200° C. and maintaining this temperature for 30 minutes, did not cause an explosion.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are to be included within the spirit and purview of this application and scope of the appended claims. All publications, patents, and patent applications cited herein are hereby incorporated by reference for all purposes in their entirety.

What is claimed is:

1. A method for producing a non-explosive scent simulant of a chemical explosive material comprising the following steps:
   a) cooling a solution of a non-explosive reactant to between 15° C. to −10° C.;
   b) optionally adding an oxidant;
   c) adding a density controlling material to form a slurry;
   d) adding an acid to said slurry of step c.), thereby forming a non-explosive scent simulant of chemical explosive material formed within the interstices of said density controlling material;
   e) optionally neutralizing the slurry;
   f) filtering the slurry to collect said non-explosive scent simulant; and
   g) optionally rinsing the said non-explosive scent simulant.

2. The method of claim 1, wherein said non-explosive scent simulant obtained in step f.) is capable of simulating the scent of a chemical explosive material.

3. The method of claim 2, wherein said chemical explosive material is selected from a group consisting of 5-nitro triazol-3-one (NTO), trinitrotoluene (TNT), trinitro triamino benzene (TATB), 3,5-dinitro-2,6-bis-picrylamino pyridine (PYX), nitroglycerine (NG), ethylene glycol dinitrate (EGDN), diethylene glycol dinitrate (DEGDN), Semtex, Pentolite, Composition B and its variations, composition C and its variations, 2,2-bis[(nitroxy)methyl]-1,3-propanediol dinitrate (or pentaeritol tetranitrate) (PETN), trimethylol ethyl trinitrate (TMETN), tetryl, hexahydro-1,3,5-trinitro-1,3,5-triazine (RDX), methylamine nitrate, nitrocellulose, octahydro-1,3,5,7-tetranitro-1,3,5,7-tetrazocine (HMX), nitroguanidine, potassium nitrate, ammonium nitrate, urea nitrate, ammonium picrate, triacetone triperoxide (TATP), diacetone peroxide, tributanone triperoxide (TBTP), hexamethylene triperoxide (HMTD), mannitol hexanitrate, cyclohexanone peroxide, energetic salts, diacetone alcohol peroxide, and methylcyclohexanoneperoxide. thereof.

4. The method of claim 1, wherein said non-explosive reactant of step a.) is a non-explosive precursor of a chemical explosive material.

5. The method of claim 4, wherein said non-explosive precursor is an organic compound.

6. The method of claim 4, wherein said non-explosive precursor is an inorganic compound.

7. The method of claim 5, wherein said organic compound is selected from a group consisting of triazol-3-one, benzene, naphthalene, stilbene, toluene, mononitrotoluene, dinitrotoluene, nitrobenzene, phenol, triamino benzene, urea, 2,6-bis-picrylamino pyridine, glycerine, glucose, ethylene glycol, diethylene glycol; pentaeritol; cellulose, mannitol, ethyl trimethylol, hexahydro-1,3,5-triazine, methylamine, octahydro-1,3,5,7-tetrazocine, diazophenol, phenylmethylnitramine, hexoses, ketoses, methylene diamine, hexamine, acetone, and butanone.

8. The method of claim 6, wherein said inorganic compound is selected from a group consisting of potassium chloride and ammonium hydroxide.

9. The method of claim 1, wherein said non-explosive scent simulant is at a concentration that is non-detonable.

10. The method of claim 1, wherein an oxidant is optionally added to the solution of step a.).

11. The method of claim 10, wherein said oxidant is a peroxide.

12. The method of claim 11, wherein said peroxide is hydrogen peroxide.

13. The method of claim 10, wherein said oxidant is a nitrating agent.

14. The method of claim 10, wherein said optionally added oxidant is selected from a group consisting of calcium peroxide, strontium peroxide, barium peroxide, and peracetic acid.

15. The method of claim 1, wherein said density controlling material of step c.) is an organic material that is chemically inert to the chemical explosive material within the density controlling material's interstices.

16. The method of claim 15, wherein said organic material is selected from a group consisting of natural polymer gums, synthetic polymers gums, wood flour and flours, fibers of other natural products, synthetic fibers, grain husks, odor free cellulose, saw-dust, nut shells, starches, and starch derivatives.

17. The method of claim 1, wherein said density controlling material of step c.) is an inorganic material.

18. The method of claim 17, wherein said inorganic material is selected from a group consisting of clay, zeolites, silica, porous glass beads, glass fibers, calcium carbonate, talc, kaolin, mica, barium sulfate, metal oxides and hydroxides, carbon black, and graphite.

19. The method of claim 1, wherein said density controlling material of step c.) is chemically inert to the reactants of step a.).

20. The method of claim 1, wherein said density controlling material of step c.) is added to form about 2 to 10000 times by weight of the expected dry weight of said scent simulant obtained in step f.).

21. The method of claim 1, wherein said density controlling material of step c.) has a pore size of about 100 micometers to about 0.10 nano-meters.

22. The method of claim 1, wherein said density controlling material of step c.) has a porosity of about 2% to about 98%.

23. The method of claim 1, wherein said acid used in step d.) is an organic acid.

24. The method of claim 23, wherein said organic acid is selected from a group consisting of acetic acid, peracetic acid, citric acid, phosphoric acid, phosphorous acid, adipic acid, malic acid, phthalic acid, oxalic acid, cinnamic acid, benzoic acid, hydroxybenzoic acid, glycolic acid, formic acid, glycolic acid, lactic acid, propionic acid, butyric acid, acrylic acid, muriatic acid, sulfamic acid, tartaric acid, and glucuronic acid.

25. The method of claim 1, wherein said acid added in step d.) is an inorganic acid.

26. The method of claim 25, wherein said inorganic acid is selected from a group consisting of hydrochloric acid, sulfuric acid, and nitric acid.

27. The method of claim 1, wherein said scent simulant formed in the process of step d.) is optionally neutralized.

28. The method of claim 1, wherein said scent simulant of step f.) is optionally rinsed with distilled water, alcohol, or alkaline solutions ranging from about 1% alkalinity to about 25% alkalinity.

29. The method of claim 1, wherein the scent simulant of step f.) is vacuum filtered.

30. The method of claim 1, wherein steps a.) through g.) may be carried out in a shear mixer.

31. The method of claim 1, wherein steps a.) through g.) may optionally occur at temperatures ranging from about 70° C. to about −10° C.

32. The method of claim 1, further comprising mixing said scent simulant in step g.) with a gelling agent or a binding agent to form a gel or a solid, said solid or said gel can be stored and transported in the same manner as said scent simulant.

33. The method of claim 32, wherein the gelling agent is selected from a group consisting of hydrogels, rigid gels, and elastic gels.

34. The method of claim 32, wherein the binding agent may be a polymer having a molecular weight of at least 300 atomic mass units.

35. The method of claim 1, further comprising mixing said scent simulant in step g.) to form an emulsion.

36. The method of claim 1, wherein said scent simulant obtained in step g.) can be adjusted for its yield, density, and crystallinity, and said scent simulant can be exposed to sniffing animals and detective devices.

37. The method of claim 36, wherein said density can be controlled by an acid catalyzed reaction between an organic compound and a peroxide.

38. The method of claim 36, wherein said density can be controlled by a reaction between an organic or inorganic compound and a nitrating acid.

39. The method of claim 1, wherein said density controlling material may be from a range of 60% to about 99.5% by weight compared to the weight of the explosive material within the density controlling material's interstices.

40. The method of claim 1, wherein said scent simulant may include from 0% to about 40% water by weight.

41. The method of claim 1, wherein said scent simulant is safely transportable.

42. The method of claim 1, wherein said scent simulant comprises TATP and diatomaceous earth in a ratio ranging from about 40:60 to about 1:99 respectively.

43. The method of claim 1, wherein said scent simulant comprises HMTD and diatomaceous earth in a ratio ranging from about 40:60 to about 1:99 respectively.

44. The method of claim 1, wherein said scent simulant comprises TATP, saw-dust, and water in ratios ranging from about 25:70:5 to about 5:70:25 respectively.

45. The method of claim 1, wherein said scent simulant comprises HMTD, saw-dust, and water in ratios ranging from about 25:70:5 to about 5:70:25 respectively.

46. The method of claim 1, wherein said scent simulant comprises TNT, diatomaceous earth, and water in ratios ranging from about 25:70:5 to about 5:70:25 respectively.

47. The method of claim 1, wherein said scent simulant comprises PETN and diatomaceous earth in ratios ranging from about 40:60 to about 1:99 respectively.

48. The method of claim 1, wherein said scent simulant comprises PETN, diatomaceous earth, and water in ratios ranging from about 25:70:5 to about 5:70:25 respectively.

49. The method of claim 1, wherein said scent simulant comprises RDX and diatomaceous earth in ratios ranging from about 40:60 to about 1:99 respectively.

50. The method of claim 1, wherein said scent simulant comprises RDX, diatomaceous earth, and water in ratios ranging from about 25:70:5 to about 5:70:25 respectively.

51. The method of claim 1, wherein said scent simulant comprises DNT and diatomaceous earth in ratios ranging from about 40:60 to about 1:99 respectively.

52. The method of claim 1, wherein said scent simulant comprises DNT, diatomaceous earth, and water in ratios ranging from about 25:70:5 to about 5:70:25 respectively.

53. The method of claim 1, wherein said scent simulant comprises potassium nitrate and diatomaceous earth in ratios ranging from about 40:60 to about 1:99 respectively.

54. The method of claim 1, wherein said scent simulant comprises ammonium nitrate and diatomaceous earth in ratios ranging from about 40:60 to about 1:99 respectively.

55. The method of claim 1, wherein said scent simulant comprises nitroglycerin, diatomaceous earth, and water in ratios ranging from about 25:70:5 to about 5:70:25 respectively.

56. The method of claim 1, wherein said scent simulant comprises potassium chlorate, diatomaceous earth, and water in ratios ranging from about 25:70:5 to about 5:70:25 respectively.

57. The method of claim 1, wherein said scent simulant comprises urea nitrate, diatomaceous earth, and water in ratios ranging from about 25:70:5 to about 5:70:25 respectively.

58. The method of claim 1, wherein said scent simulant comprises HMX, diatomaceous earth, and water in ratios ranging from about 25:70:5 to about 5:70:25 respectively.

* * * * *